No. 796,664. PATENTED AUG. 8, 1905.
A. DE LASKI.
TIRE.
APPLICATION FILED OCT. 26, 1904.
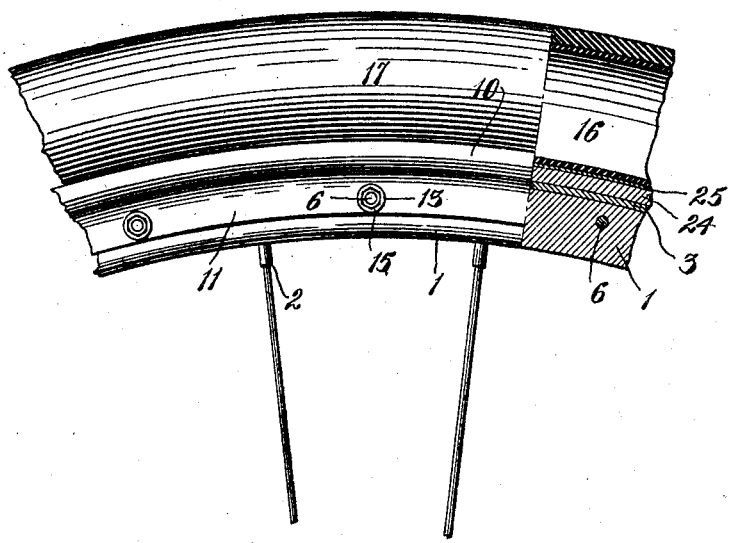
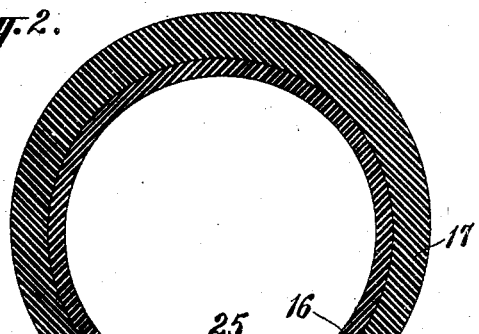
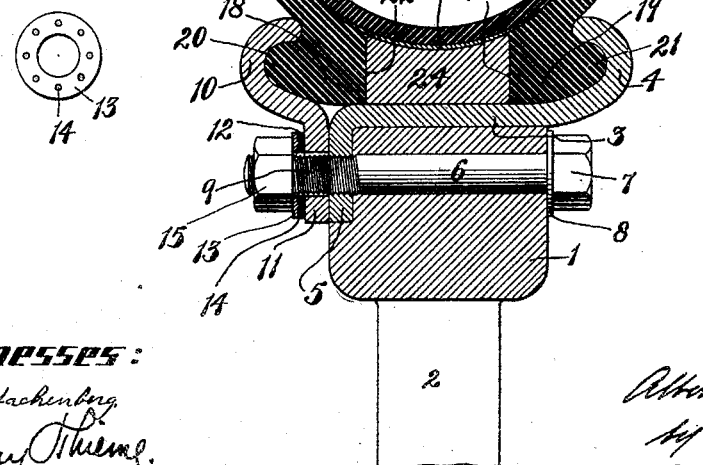
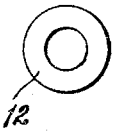

UNITED STATES PATENT OFFICE.

ALBERT DE LASKI, OF WEEHAWKEN, NEW JERSEY.

TIRE.

No. 796,664.     Specification of Letters Patent.     Patented Aug. 8, 1905.

Application filed October 26, 1904. Serial No. 230,006.

*To all whom it may concern:*

Be it known that I, ALBERT DE LASKI, a citizen of the United States, and a resident of Weehawken, in the county of Hudson and State of New Jersey, have invented a new and useful Improvement in Tires, of which the following is a specification.

My invention has for its object to provide certain improvements in the construction, form, and arrangement of the several parts of a vehicle-wheel rim and tire of the clencher type whereby the tire-shoe may be readily locked and released from the rim and when locked to the rim will be absolutely secured against unintentional displacement whether the inner tube be inflated or deflated.

One object of my invention more specifically is to provide a locking-ring which is adapted to be inserted between the vertical opposite walls of the separated base portions of the tire-shoe, so that the strain upon the locking-ring comes laterally thereon rather than diagonally, as has heretofore been common. It has been found that when the locking-ring has been engaged with inclined faces of the shoe there is a tendency, especially when the inner tube is deflated, to slide the ring laterally and outwardly at one point sufficient to loosen the shoe from the rim, thereby causing it to creep and now and then to become detached from the rim.

Another object of my invention is to provide a divided channeled rim in which one rim-section is removable, while the other rim-section is still locked to the third or spoke-engaging section of the rim.

In the accompanying drawings, Figure 1 is a view in side elevation, partly in section, of a portion of a vehicle-wheel and tire attached thereto. Fig. 2 is an enlarged transverse section through the same. Fig. 3 is a detail face view of the metallic locking-washer, and Fig. 4 is a similar view of the yielding locking-washer.

The inner section of the rim of the wheel is denoted by 1, which section is shown herein of wood and as fitted to receive the spokes 2 of the wheel. A second member of the rim is shown as having a laterally-extended portion 3 fitted to the periphery of the inner section 1, a circumferential hook portion 4, and an inwardly-extended circumferential flange 5. The hook portion 4 is located upon one side of the wheel, and the inwardly-extended flange is located upon the other side of the wheel. In the present instance this flange 5 is shown as countersunk into the side of the inner section 1 of the rim. A series of bolts 6 extend transversely through the section 1 of the rim and the inwardly-extended flange 5 of the section 3 of the rim. These bolts 6 are each provided with a head 7, between which and one side of the section 1 is interposed a washer 8. This bolt 6 has a screw-threaded engagement with the flange 5, so that when the bolt is screwed into position the section 3 of the rim will be securely locked in place. This screw-threaded portion of the bolt 6 is denoted by 9 and extends a short distance exterior to the flange 5. The removable section of the divided rim is provided with a circumferential hook portion 10 and an inwardly-extended annular flange 11. This flange 11 is provided with a series of holes for permitting the free insertion and removal of the section over the screw-threaded ends of the bolts 6. A yielding locking-washer 12 is provided for each of the bolts 6, which washer is preferably made of vulcanized rubber. A second locking-washer 13, of metal, is also provided for each one of the bolts 6, which washer is preferably provided with a plurality of projections 14 on its inner face, arranged to be forced into the body of the yielding washer 12 when the parts are assembled. A nut 15 is provided for each of the bolts 6, which nut, when screwed home, will force the removable section of the rim into engagement with its corresponding section and will also cramp the washers 12 13 between it and the said removable section. I have found that the provision of this yielding washer 12 absolutely prevents the unintentional unscrewing of the nuts 15, thus serving as a simple and effective nut-lock.

The inner tube of the clencher-tire herein illustrated is denoted by 16 and may be of any well-known and approved form.

The tire-shoe is denoted by 17, and it is provided with separated base portions 18 19, having exterior circumferential beads 20 21 arranged to fit snugly into the circumferential hook portions 4 and 10 of the divided rim. These base portions 18 19 are provided with vertical opposite walls 22 23, which may be made plain or rough, as desired.

A non-elastic locking-ring 24, composed of wood or other suitable material, is provided with vertical sides, which engage the vertical opposite walls 22 23 of the separated base portions of the tire-shoe. A flexible flap or apron 25 is secured to the outer face of the locking-ring 24, the sides of the flap serving to lap over the joints between the ring and the base portions for preventing the pinching or chafing of the inner tube 16 of the tire. It will be seen that by inserting the locking-ring between vertical opposite walls the base portions of the tire-shoe are held absolutely against any lateral movement away from their circumferential hook portions of the rim, there being no tendency to force the locking-ring outwardly at any point, and thus release the shoe a sufficient distance to permit it to creep or become displaced. Furthermore, when it is desired to remove the shoe the removable section of the rim may be taken off without releasing its coacting rim-section.

What I claim as my invention is—

1. A vehicle-wheel having an inner rim-section, a permanent outer rim-section, bolts passing through the inner rim-section and having a screw-threaded engagement with the outer rim-section for securing it to the inner rim-section, a removable outer rim-section arranged to be inserted over the ends of said bolts, and nuts for securing the removable outer rim-section in place.

2. A vehicle-wheel having an inner rim-section, a permanent outer rim-section having a lateral portion fitted to the periphery of the inner rim-section, a circumferential hook portion at one side of the wheel and an inwardly-extended annular flange at the other side of the wheel, bolts having screw-threaded engagements with the annular flange for permanently securing said outer rim-section to the inner rim-section and a removable outer rim-section having an annular hook portion and also an annular inwardly-extended flange arranged to be inserted over the ends of said bolts and nuts for securing the removable rim-section in place.

In testimony that I claim the foregoing as my invention I have signed my name, in presence of two witnesses, this 17th day of October, 1904.

ALBERT DE LASKI.

Witnesses:
    FREDK. HAYNES,
    HENRY THIEME.